United States Patent Office 3,261,783
Patented July 19, 1966

3,261,783
COMPOSITIONS AND PROCESSES FOR CURING EPOXY RESINS AND PRODUCTS RESULTING THEREFROM
Gilbert F. Pollnow and Daniel T. Haworth, Milwaukee, Wis., assignors to Allis-Chalmers Manufacturing Company, Milwaukee, Wis.
No Drawing. Filed June 1, 1961, Ser. No. 114,035
7 Claims. (Cl. 260—2)

The present invention relates generally to compositions and processes for curing epoxy resins and products resulting therefrom. More particularly, the invention relates to new processes for curing epoxy resins, unique boron containing inorganic curing agents, and to the very useful products produced thereby.

Specifically, the present invention provides a new process for curing and resinifying epoxy resins into cross-linked polyethers, and particularly but not exclusively epoxy resins of the type represented by the glycidyl polyethers of polyhydric phenols and polyhydric alcohols, which comprises mixing and reacting the epoxy resin with a chloroborazine as shall hereinafter be described in detail. The invention further provides resinous products which are thermally stable, and possess good flexural strength as shall also appear hereafter.

As is well known, the three membered ring of the epoxide group is highly reactive. The ring opening is accompanied by formation of addition compounds. The ring opening normally occurs upon treatment of the epoxy resin with a reagent having the propensity to open the ring and to polymerize the resin chain to form a resinous product. Polymerization may result in linear polymers or cross linked resins depending upon the functionality of the reagent. In the latter case, these reagents are called "curing agents" or "hardening agents."

Epoxy resins, such as those obtained by reacting epichlorohydrin with polyhydric phenols in the presence of caustic, have heretofore been cured with various organic substances including the primary and secondary polyamines, the tertiary amines, organic acids, organic acid anhydrides and, more recently, with borontrifluoride-amine complexes. The use of these materials has, however, not been entirely satisfactory for certain applications.

Known amine curing agents, for example, give resinous products which fail to retain their hardness and strength at elevated temperatures. Still further, the amine type curing agents, such for example as diethylene-triamine and dimethylamine, are extremely fast acting when used with the glycidyl polyethers. As a result, such resins must be used almost immediately after the curing agent is admixed therewith. Unused portions of the mixture have to be thrown away to prevent its hardening or setting up in the mixing container. Furthermore, many of the amines are highly toxic, and certain of them are highly odoriferous and generally unpleasant to handle.

Known organic acids and acid anhydrides curing agents suffer in that they show little activity in the cure of epoxy resins at room temperature or at slightly elevated temperatures and are effective only at very high temperatures. This prevents their use in the preparation of compositions that are to be cured at room temperatures or compositions that might be injured by the high temperatures. Even at very high temperatures, the anhydrides in many cases act very slowly and they are unable to be used in compositions which must be cured rapidly. Furthermore, the products obtained by the use of the anhydrides are sometimes deficient, particularly as to hardness and durability.

Still further, many of the acid anhydrides, such for example as maleic anhydride and phthalic anhydride, when mixed with epoxy resins, provide mixtures having a relatively short pot life. A further disadvantage of the acid anhydrides resulting from the need for high temperature mixing is that subsequent cooling frequently causes precipitation of the catalyst with the resulting lack of homogeneity and reduction of physical properties.

The borontrifluoride-amine complexes have also proved to be not too useful as commercial curing agents for epoxy resins because the mixture of $BF_3$-amine complex and epoxy resin has a relatively short pot life and must be used very quickly after its preparation. This is especially undesirable for the operators of small plants since they need a resinous mixture which can be utilized over a long period of time. Some of the most active complexes, for example, $BF_3$-phenol, set up almost instantaneously upon mixture with the resin whereupon the proper dispersion of the agent throughout the resin is substantially impossible. Furthermore, the cured products obtained by the use of the $BF_3$-amine complexes fail to have the flexibility and impact strength required for many industrial applications.

As is clearly apparent from the foregoing discussion, there exists an unsatisfied need for new and better curing agents for use with epoxy resins. It is toward the satisfaction of this general goal that the work resulting in the present invention was initiated.

Accordingly, one of the primary objects of the present invention is to provide a new process for curing epoxy resins which eliminates many of the disadvantages attending prior processes.

Another object is to provide a method for curing epoxy resins which gives cured resinous products having improved properties.

A still further object is to provide improved curing agents which, when employed with epoxy resins, provide an easily handled system for the production of dimensionally stable polyethers.

Still a further object is to provide an improved curing agent for epoxy resins which is inorganic in composition and contains chloroborazine as an essential ingredient.

These and still further objects as shall hereinafter appear, are fulfilled by the present invention to a remarkably unexpected extent and in an unobvious fashion as will be readily discerned from the following detailed description of embodiments exemplifying the several salient aspects of the invention.

Considering the present invention in its more specific embodiments, certain logical breakdowns appear desirable in order that the description will be clearly understood. For this reason, the description will be grouped into sections respectively entitled "Epoxy Resins," "Chloroborazines and Preparation Thereof," "Epoxy Resin-Curing Agent System," and "Processes and Polyether Products."

POLYEPOXIDE

"Epoxy resins," as that term is used herein, defines those partially polymerized organic compounds having a 1,2-epoxy equivalency of greater than unity.

"Epoxy equivalency," as used herein, means the number of 1,2-epoxy groups, viz.,

contained in the average molecule of a given compound. Where a substantially pure compound is used, such for example as the diglycidyl ether of epichlorohydrin and Bisphenol A, the epoxy equivalent will be the integer two. In the more general case where the epoxy equivalent is desired, the "compound" consists of a mixture of molecules having differing molecular weights and differing numbers of epoxy groups. In this case, the epoxy equivalent will, of necessity, be greater than unity and not necessarily an integer. For example, a glycidyl ether particularly suitable in the practice of the present invention as shall hereinafter appear is the reaction product of reacting 2,2-bis(4-hydroxyphenyl) propane, (Bisphenol A) with epichlorohydrin in the presence of an alkali according to the reaction:

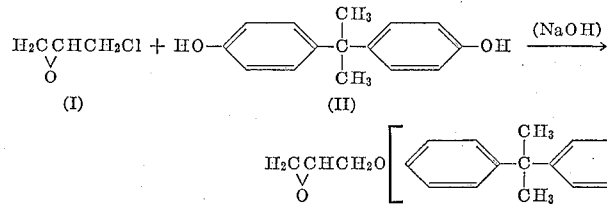

Thus, if two moles of I are mixed with one mole of II, the product III will on the average contain two epoxy groups per molecule (one at each end) and its epoxy equivalent will be 2. If a 1:1 mole ratio of reactants is used, the product will have an average of 1 epoxy equivalent per molecule. This will not be a product usable in the present invention for, as indicated above, to be an epoxy resin in terms of this invention, the epoxy equivalent must be greater than 1.

The glycidyl ethers used in this invention may contain the elements: carbon, hydrogen, oxygen and silicon. They include the 1,2-epoxy polyethers of such polyhydric alcohols as ethylene glycol, propylene glycol, trimethylene glycol, diethylene glycol, triethylene glycol, glycerol, dipropylene glycol, 1,2-tetramethyl disilanol and the like.

It is further found that the more recent commercial epoxy resins derived via the peracetic acid epoxidation of olefins can also be used. An example is Epoxide 201, manufactured by Union Carbide, New York, New York, which is 3,4-epoxy-6-methyl cyclohexylmethyl-3,4-epoxy-6-methyl cyclohexanecarboxylate. The Epoxide 201 type resins are of the so-called "quick setting" type resins and, while they require prompt handling, the curing agents of the present invention, as shall appear, are quite effective with these also.

In the following description, the epoxy resins of the present invention will, for the most part, be exemplified by Epon 828 which is manufactured by the Shell Chemical Company of Chicago, Illinois.

Epon 828 is an epoxy resin of diglycidyl ether of Bisphenol A and epichlorohydrin and has the general chemical structure indicated by III in the equation set forth above where "n" may be 0, 1, 2, etc.

By and large, this type of resin makes up the bulk of the liquid epoxy resins manufactured and sold in the United States.

CHLOROBORAZINES AND PREPARATION THEREOF

"Chloroborazines," as that term is used herein, defines those benzenelike compounds having a planar ring containing three atoms of boron (B) and three atoms of nitrogen (N) in juxtaposition with each other, and in which the hydrogen (H) atoms attached to the boron atoms have been replaced by chlorine (Cl) atoms, and the hydrogen atoms connected to the nitrogen atoms remain, a part or all of them being replaced by a substituent selected from the group consisting of the alkyl and aryl radicals, such for example as $CH_3$, $C_2H_5$, $C_3H_7$, etc., as alkyls, and $C_6H_5$ (phenyl) as aryls.

Structurally, therefore, the chloroborazine assumes the appearance:

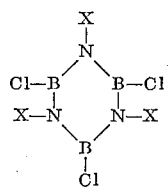

wherein "X" represents either unsubstituted hydrogen or a substituent (R) selected from the group consisting of the aforementioned alkyl and aryl radicals.

Several techniques are well known for synthesizing a chloroborazine.

One which has proven especially convenient involves reacting boron trichloride with a reagent selected from the group consisting of the primary amines, the primary ammonium hydrochloride salts and ammonium chloride in the presence of a suitable polar solvent such as sym-2,4-tetrachloroethane.

The reaction, when a primary ammonium hydrochloride salt is employed, proceeds as follows:

(1) $3BCl_3 + 3RNH_2HCl \rightarrow B_3Cl_3N_3R_3 + 9HCl$

By varying the "R" group, as indicated previously, it is thus possible to form, when "R" is an alkyl such as the methyl group, B-trichloro-N-trimethylborazine $$(B_3Cl_3N_3(CH_3)_3)$$

or, when "R" is an aryl such as the phenyl group, B-trichloro-N-triphenylborazine $(B_3Cl_3N_3(C_6H_5)_3)$.

When it is desired to form B-trichloroborazine $$(B_3Cl_3N_3H_3)$$

borontrichloride may simply be reacted with ammonium chloride in a controlled reaction which proceeds as follows:

(2) $3BCl_3 + 3HNH_3Cl \rightarrow B_3Cl_3N_3H_3 + 9HCl$

If desired, borazine $(B_3H_3N_3H_3)$ may first be formed which is then reacted to effect the direct replacement of the hydrogen associated with the boron atoms with chlorine atoms to form B-trichloroborazine which may then be processed as above indicated.

EPOXY RESIN-CURING AGENT SYSTEMS

The general mechanism of the epoxy resin-curing agent system of the present invention is that the curing agent possesses the propensity to open the epoxy rings of the epoxy resin and polymerize the resin by linking thereto. It has been determined that cross linking is likewise initiated during the initial cure which occurs, preferably, upon heating to about 140° C. The cross linking is completed by post curing, either with or without the application of additional heat. The post cure is accelerated by the heat which seems to inspire molecular movement out of blocking relationships to expedite the completion of the cross linking.

PROCESSES AND POLYETHER PRODUCTS

To aid in the achievement of a more complete understanding of the present invention, the following examples are presented to exemplify, and not to limit, the processes which may be employed in the practice of the present invention.

*Example I*

Six parts by weight B-trichloroborazine are added to 100 parts by weight of Epon 828 and the reagents are warmed to 140° C. where they are held for about ten minutes to effect the dissolution of the chloroborazine.

The warmed solution of resin and B-trichloroborazine is then completely admixed as by stirring until all of the curing agent is dispersed in the resin and a substantially completely homogeneous mixture is formed. The mixture is then cast into a preshaped mold and cured at about 150° C. for two hours. The initial cure is then followed by a post cure at 200° C. for two hours. The sample is then tested. Results of such tests are reported in the following table.

TABLE I

| Frequency (cps.) | $10^2$ | $10^3$ | $10^4$ | $10^5$ |
|---|---|---|---|---|
| Dissipation Factor (×1,000) | 10.8 | 2.6 | 4.2 | 5.3 |
| Dielectric Constant | 4.2 | 4.5 | 4.4 | 4.7 |
| Flexural Strength | 13,800–15,000 lbs./in.$^2$ | | | |

*Example II*

Four p.p.h. of B-trichloroborazine are mixed with Epon 828 at 140° C. The mixture is then stirred to assure its homogeneity and cast into preformed molds. The cast samples are then cured at about 150° C. for two hours and post cured at about 200° C. for two hours. This sample is then tested. Results of such tests are reported below.

TABLE II

| Frequency (cps.) | $10^2$ | $10^3$ | $10^4$ | $10^5$ |
|---|---|---|---|---|
| Dissipation Factor (×1,000) | 11.6 | 4.2 | 4.4 | 9.0 |
| Dielectric Constant | 3.7 | 3.6 | 3.6 | 3.4 |
| Flexural Strength | 7,000 lbs./in.$^2$ | | | |

*Example III*

Six p.p.h. of B-trichloroborazine are mixed with Epon 828 at about 165° C. and the mixture stirred slightly to insure its homogeneity. After about ten minutes of heating, the mixture was poured into precast molds. The cast samples were cured at about 180° C. for one hour and post cured at 200° C. for four hours. The samples were tested. Results of such testing are set forth below.

TABLE III

| Frequency (cps.) | $10^2$ | $10^3$ | $10^4$ | $10^5$ |
|---|---|---|---|---|
| Dissipation Factor (×1,000) | 10.8 | 6.4 | 5.4 | 3.9 |
| Dielectric Constant | 3.9 | 3.9 | 4.0 | 3.9 |
| Flexural Strength | 11,100–13,000 lbs./in.$^2$ | | | |

*Example IV*

Six parts of B-trichloro-N-trimethylborazine, $$B_3Cl_3N_3(CH_3)_3$$

are mixed with 100 parts of Epon 828 to about 165° C. and stirred. After about five minutes, the mixture was cast. The cast resin was cured at about 200° C. for 18 hours.

The electrical properties were measured as follows:

TABLE IV

| Frequency (cps.) | $10^2$ | $10^3$ | $10^4$ | $10^5$ |
|---|---|---|---|---|
| Dissipation Factor (×1,000) | 3.7 | 3.7 | 4.0 | 6.2 |
| Dielectric Constant | 3.8 | 3.8 | 3.6 | 3.7 |
| Flexural Strength | 12,300 lbs./in.$^2$ | | | |

*Example V*

Eight parts of B-trichloro-N-trimethylborazine are mixed with 100 parts Epon 828 at about 165° C. and stirred. After about seven minutes, the mixture was cast into molds. The cast resin was cured at about 200° C. for 18 hours. The electrical properties of the cured epoxide were measured and are reported in Table V.

TABLE V

| Frequency (cps.) | $10^2$ | $10^3$ | $10^4$ | $10^5$ |
|---|---|---|---|---|
| Dissipation Factor (×1,000) | 4.9 | 5.9 | 5.1 | 8.3 |
| Dielectric Constant | 3.9 | 3.9 | 3.9 | 3.9 |
| Flexural Strength | 15,500 lbs./in.$^2$ | | | |

It has been found generally desirable to handle the chloroborazines at temperatures in excess of the normal boiling point of water (above 100° C. at mean sea level) in order to inhibit their hydrolysis. This is primarily a matter of convenience since the borazines are more easily handled than are the acids resulting from such hydrolysis.

After the initial cure, it has been found desirable to effect a post cure of the polymer. The essential effect of a post cure is believed to be the enhancement of the degree of cross linkage occurring in the polymer. It is our experience, however, that the initial cure alone will effect sufficient cross linkage for many applications to which the polymer shall be put.

If, on the other hand, the exigencies of a particular application make it desirable that a post cure be completed quickly and before the polymer is placed in service, it can be achieved by heating the preformed initially cured polymer to a temperature of about 180–200° C. whereupon the heat increases the freedom of molecular motion in the polymer, reduces its density and substantially accelerates to completion the cross linkage reactions already begun.

In mixing curing agent with the epoxy resin, it is found that the ratio of curing agent to resin (by weight) should fall between about 4 and 8 parts per hundred.

If less than about 4 phr. of curing agent/resin are used, the resulting polymer contains considerable unreacted resin with the result that its mechanical and electrical properties are poor to unsatisfactory. On the other hand, if more than about 8 phr. of curing agent/resin are used, it will be increasingly difficult to get all of the chloroborazines into solution and the resultant polymer containing unsolubilized curing agent will have reduced thermal properties. In addition, such a polymer will have substantially no water stability. Of course, where inflexibility and thermal properties are of no consequence to a particular application, the introduction of curing agent per hundred parts of resin may be increased up to the solubility limits of the mixture.

The foregoing limits on mixture ratios have been found equally applicable to other chloroborazines and, therefore, may be considered the general standard for the group.

Slight variations of curing agent from the phr. ranges recited are, of course, permissible to accentuate particular properties or to respond to extraordinary curing treatment but such "forcing" of properties is within the skill of the art to determine the exact formulation needed to satisfy a particular requirement and does not require further discussion here.

In every instance, even and uniform curing is obtained utilizing the curing agents and techniques of the present invention.

The polyether products of the present invention possess high thermal stability and rate well under testing according to the ASTM Standards on Plastics.

The specific tests employed are the ASTM test for flexural properties of plastics (D790–49T), for A.C. capacitance, dielectric constant and loss characteristics of electrical insulating materials (D150–54T), for resistance of plastics to chemical reagents (D543–52T), and for tensile properties of plastics (D638–52T). In connection with procedure D150–54T, a capacitance bridge, type 716–C manufactured by the General Radio Company, Cambridge, Massachusetts, was employed.

The properties of the polyether formed by mixing a suitable amount of a chloroborazine with Epon 828 to form a homogeneous mixture in the manner indicated above, initially curing the mixture and, if indicated, post curing the initially cured resin.

The samples used for the electrical measurements reported above were the same samples subsequently used for mechanical and chemical testing.

The chemical tests to which organic plastic materials may be subjected are many. In order to provide an appreciation of relative chemical resistance, the samples were subjected to water vapor, a typical acid ($H_2SO_4$), and a typical base (NaOH). The weight data for several samples are reported in Table VI.

TABLE VI

| Sample No.[a] | Weight Loss [b] | Humidity,[c] Percent | 30% $H_2SO_4$,[d] Percent | 10% NaOH, Percent |
|---|---|---|---|---|
| I | 3.05% in 6 days | 0.53 | 0.13 | 0.85 |
| III | 2.29% in 6 days | 0.46 | 0.55 | 0.57 |
| IV | 3.93% in 7 days | 0.47 | 0.60 | 0.67 |
| V | 5.97% in 7 days | 0.50 | 0.66 | 0.64 |

[a] Sample Nos. correspond to previously cited examples. All tests were conducted with cured specimens of 5 x 5 x 3.5 cm.
[b] Weight loss in a constant draft oven at 200° C.
[c] One hour exposure at 100° F. and 100% humidity. Values indicated are weight increase.
[d] Seven days immersion at ambient temperatures. Values indicated by weight increase.

High quality mechanical and electrical properties at room temperature are also found in samples formed by mixing varying amounts of the desired chloroborazine with Epoxide 201, one of the so-called quick setting epoxy resins formed of 3,4-epoxy-6-methylcyclohexylmethyl 3,4-epoxy-6-methylcyclohexane carboxylate.

In preparing these samples, care is required to pour the Epoxide 201 curing agent mixture within about a minute or so after mixing at room temperature because the initial cure occurs so rapidly.

From the foregoing it becomes readily apparent that a new class of curing agents has been developed which reacts with epoxy resins, and especially those of the diglycidyl ether of Bisphenol A type, to provide polymers having remarkably unexpected properties and that the agents, the system and the polymers fulfill all of the aforestated objects to a remarkably unexpected extent.

It is, of course, understood that such modification of resins, variation of curing schedules and application of the polymeric product as may occur to one skilled in this art so as to create accentuated physical properties in accordance with presently known technology are considered within the scope of the present invention.

It is further understood that such modification, alteration and variation of the basic concepts here presented are considered within the spirit of the present invention, especially as it is defined by the scope of the claims appended hereto.

Having now particularly described and ascertained the nature of our said invention and the manner in which it is to be performed, we declare that what we claim is:

1. A heat curable composition comprising a polyepoxide having a

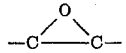

epoxy equivalency greater than 1.0 and about 4 to about 8 parts per hundred by weight of a B-trichloroborazine having the general structural formula

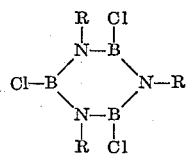

wherein R is a member of the class comprising hydrogen, the lower alkyl groups and phenyl groups.

2. The composition of claim 1 wherein the B-trichloroborazine is B-trichloroborazine.

3. The composition of claim 1 wherein the B-trichloroborazine is B-trichloro-N-trimethylborazine.

4. The composition of claim 1 wherein the polyepoxide is 3,4-epoxy - 6 - methylcyclohexylmethyl-3,4-epoxy-6-methylcyclohexanecarboxylate.

5. The composition of claim 1 wherein the polyepoxide is a glycidyl polyether of a polyhydric alcohol having a 1,2-epoxy equivalency greater than 1.0.

6. The composition of claim 1 wherein the polyepoxide is a glycidyl polyether of a polyhydric phenol having a 1,2-epoxy equivalency greater than 1.0.

7. The composition of claim 6 wherein the glycidyl polyether of a polyhydric phenol is the condensation product of epichlorohydrin and 2,2-bis(4-hydroxyphenyl) propane.

References Cited by the Examiner

UNITED STATES PATENTS

| 2,892,869 | 6/1959 | Groszos et al. | 260—551 |
| 2,941,981 | 6/1960 | Elbling et al. | 260—47 |
| 2,951,867 | 9/1960 | Stafiej et al. | 260—47 |
| 2,970,130 | 1/1961 | Finestone | 260—47 |

OTHER REFERENCES

Lee et al.: "Epoxy Resin," McGraw-Hill Book Co., Inc., N.Y., 1957, p. 113 relied on.

Skeist: "Epoxy Resins," Reinhold Publishing Corp., New York, 1958, p. 29 relied on.

Grant: "Hackh's Chemical Dictionary," 3rd ed., McGraw-Hill Book Co., Inc., 1944, p. 310 relied on.

SAMUEL H. BLECH, *Primary Examiner.*

HAROLD BURSTEIN, WILLIAM H. SHORT,
*Examiners.*

A. L. LIBERMAN, T. D. KERWIN,
*Assistant Examiners.*